(12) United States Patent
Santra et al.

(10) Patent No.: US 8,858,860 B2
(45) Date of Patent: Oct. 14, 2014

(54) BIODEGRADABLE RETARDER FOR CEMENTING APPLICATIONS

(75) Inventors: Ashok K. Santra, Duncan, OK (US); B. Raghava Reddy, Duncan, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 2135 days.

(21) Appl. No.: 10/979,681

(22) Filed: Nov. 2, 2004

(65) Prior Publication Data

US 2006/0091572 A1   May 4, 2006

(51) Int. Cl.
*C04B 24/10* (2006.01)
*C09K 8/467* (2006.01)
*C04B 24/38* (2006.01)
*C04B 28/02* (2006.01)
*C04B 103/20* (2006.01)
*C04B 103/00* (2006.01)
*C04B 111/10* (2006.01)

(52) U.S. Cl.
CPC .............. *C04B 28/02* (2013.01); *C04B 24/10* (2013.01); *C04B 2103/20* (2013.01); *C09K 8/467* (2013.01); *C04B 2103/0074* (2013.01); *C04B 24/38* (2013.01); *C04B 2111/10* (2013.01); *C04B 2103/0072* (2013.01)
USPC ........................................................ 264/333

(58) Field of Classification Search
USPC ........................................................ 264/333
See application file for complete search history.

(56) References Cited

U.S. PATENT DOCUMENTS

| | | | |
|---|---|---|---|
| 2,848,051 A * | 8/1958 | Williams ...................... 166/291 |
| 3,245,814 A | 4/1966 | Dunlap et al. |
| 3,905,826 A | 9/1975 | Ordonez et al. |
| 3,955,992 A | 5/1976 | Roberts |
| 3,989,534 A | 11/1976 | Plunguian et al. |
| 4,047,567 A | 9/1977 | Childs et al. ................. 166/293 |
| 4,102,400 A | 7/1978 | Crinkelmeyer et al. |
| 4,120,736 A | 10/1978 | Childs et al. ................... 106/90 |
| 4,234,344 A * | 11/1980 | Tinsley et al. ................. 106/672 |
| 4,235,291 A * | 11/1980 | Messenger .................... 166/292 |
| 4,500,357 A | 2/1985 | Brothers et al. ................ 106/90 |
| 4,582,139 A | 4/1986 | Childs et al. ................. 166/293 |
| 4,662,943 A * | 5/1987 | Baker et al. .................. 106/720 |
| 4,676,832 A | 6/1987 | Childs et al. ................... 106/90 |
| 4,941,536 A | 7/1990 | Brothers et al. .............. 166/293 |
| 4,997,487 A | 3/1991 | Vinson et al. ................. 106/804 |
| 5,049,288 A | 9/1991 | Brothers et al. ............ 252/8.551 |
| 5,135,577 A | 8/1992 | Brothers et al. .............. 106/724 |
| 5,184,680 A | 2/1993 | Totten et al. .................. 166/293 |
| 5,207,831 A | 5/1993 | Cowan |
| 5,220,960 A | 6/1993 | Totten et al. .................. 166/293 |
| 5,273,580 A | 12/1993 | Totten et al. .................. 106/724 |
| 5,281,270 A | 1/1994 | Totten et al. .................. 106/687 |
| 5,336,316 A | 8/1994 | Dawson et al. |
| 5,340,397 A | 8/1994 | Brothers ....................... 106/727 |
| 5,368,642 A | 11/1994 | Rodrigues et al. ............ 106/727 |
| 5,370,181 A | 12/1994 | Nahm et al. |
| 5,417,759 A | 5/1995 | Huddleston |
| 5,421,879 A | 6/1995 | Rodrigues .................... 106/727 |
| 5,447,197 A | 9/1995 | Rae et al. |
| 5,472,051 A | 12/1995 | Brothers ...................... 166/293 |
| 5,536,311 A | 7/1996 | Rodrigues .................... 106/724 |
| 5,547,506 A * | 8/1996 | Rae et al. ..................... 106/730 |
| 5,672,203 A | 9/1997 | Chatterji et al. .............. 106/808 |
| 5,777,090 A | 7/1998 | Verraest et al. ................ 536/4.1 |
| 5,871,577 A | 2/1999 | Chatterji et al. .............. 106/808 |
| 6,176,314 B1 * | 1/2001 | Stephens ...................... 166/293 |
| 6,227,294 B1 | 5/2001 | Chatterji et al. .............. 166/293 |
| 6,273,191 B1 | 8/2001 | Reddy et al. .................. 166/293 |
| 6,336,505 B1 | 1/2002 | Reddy .......................... 166/293 |
| 6,419,016 B1 | 7/2002 | Reddy .......................... 166/293 |
| 6,454,004 B2 | 9/2002 | Reddy et al. .................. 166/293 |
| 6,457,523 B1 | 10/2002 | Vijn et al. ..................... 166/293 |
| 6,511,537 B1 * | 1/2003 | Barlet-Gouedard et al. . 106/727 |
| 6,569,488 B2 | 5/2003 | Silver ........................... 426/658 |
| 6,591,909 B1 | 7/2003 | Dao et al. ..................... 166/293 |
| 6,610,140 B2 | 8/2003 | Vijn et al. ..................... 106/738 |
| 6,630,021 B2 | 10/2003 | Reddy et al. .................. 106/809 |
| 6,708,760 B1 | 3/2004 | Chatterji et al. .............. 166/294 |
| 6,737,389 B1 * | 5/2004 | Kuzee et al. .................. 510/287 |
| 6,800,128 B2 | 10/2004 | Dao et al. ..................... 106/645 |
| 2004/0094069 A1 | 5/2004 | Chatterji et al. .............. 106/805 |
| 2004/0211339 A1 | 10/2004 | Reddy et al. .................. 106/691 |

FOREIGN PATENT DOCUMENTS

| | | | |
|---|---|---|---|
| EP | 1 657 226 A1 | 5/2006 | |
| GB | 879182 | 10/1961 | |
| WO | WO 91/17189 | 11/1991 | .............. C08B 37/00 |
| WO | WO 95/07303 | 3/1995 | .............. C08B 37/00 |
| WO | WO 95/12619 | 5/1995 | .............. C08B 31/18 |
| WO | WO 95/15984 | 6/1995 | .............. C08B 37/18 |
| WO | WO 99/64143 | 12/1999 | .............. B01F 17/00 |

OTHER PUBLICATIONS

Foreign communication from a related counterpart application dated Jul. 14, 2006.
Halliburton brochure entitled "FWCA Free-Water Cement Additive" dated 1999.
Halliburton brochure entitled "HR®-5 Cement Additive" dated 1998.
Halliburton brochure entitled "Microsand Cement Additive" dated 1999.

(Continued)

*Primary Examiner* — Christina Johnson
(74) *Attorney, Agent, or Firm* — Craig Roddy; Conley Rose, P.C.

(57) ABSTRACT

Cement compositions comprising carboxylated inulin and methods of using the same to cement a workspace. In one embodiment, a method of cementing includes providing a cement composition comprising a carboxylated inulin, for example, in a subterranean formation. The method further includes allowing the cement composition to set. In some embodiments, the cement composition has a thickening time of from about 2 hours to about 11 hours. In other embodiments, the cement composition has a viscosity that is about constant for a period of time after the cement composition is placed.

41 Claims, No Drawings

(56) References Cited

OTHER PUBLICATIONS

Halliburton brochure entitled "SA-541 Suspending Aid" dated 1999.
Halliburton brochure entitled "SCR-100 Cement Retarder" dated 1999.
Halliburton brochure entitled "SCR-500L™ High Temperature Retarder" Dated 2000.
Halliburton brochure entitled "Silicalite Cement Additive" dated 1999.
Halliburton brochure entitled "SSA-1 Strength-Stabilizing Agent" dated 1998.
Halliburton brochure entitled "SSA-2 Coarse Silica Flour" dated 1999.
Halliburton brochure entitled "Suspend HT Additive Suspending Agent" Dated 1999.
Chatterji, J., et al., "Development of a set retarder for foamed cement applications," SPE 80244, 2003, pp. 1-5, Society of Petroleum Engineers Inc.
Patent application entitled "Biodegradable retarder for cementing applications," by Ashok K. Santra, et al., filed Mar. 29, 2012 as U.S. Appl. No. 13/433,931.
Office Action dated May 9, 2012 (10 pages), U.S. Appl. No. 13/433,931, filed Mar. 29, 2012.

\* cited by examiner

BIODEGRADABLE RETARDER FOR CEMENTING APPLICATIONS

BACKGROUND OF THE INVENTION

1. Field of the Invention

This invention relates to the field of cement compositions and more specifically to the field of cement compositions comprising carboxylated inulin, for example carboxymethylated inulin, as well as methods for using such compositions to cement a workspace such as a wellbore.

2. Background of the Invention

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Secondary cementing operations may also be performed after the primary cementing operation. One example of a secondary cementing operation is squeeze cementing whereby a cement slurry is forced under pressure to areas of lost integrity in the annulus to seal off those areas.

The typical cement compositions include various components that are mixed together to form a cement slurry. The resulting reaction from the mixture of the components is fast such that the cement composition may set very rapidly, e.g., within a few minutes at room temperature and pressure. The rate of reaction further increases as the temperature increases. As such, the thickening times of the compositions may be unacceptably short to allow them to be pumped to their desired downhole locations, which make the use of such compositions in well cementing a challenge. As a result, the cement slurry may set inside the casing, which may cause expensive drill out operations.

Retardants have typically been used to lengthen the thickening time of the cement and thereby delay setting of the cement until after placement. Typical retardants include lignosulfonates such as HR-5 available from Halliburton Energy Services of Duncan, Okla., synthetic copolymers such as SCR-100 and SCR-500 available from Halliburton Energy Services, and the like. Drawbacks to using typical retardants include environmental concerns such as poor biodegradability of the retardants. To address environmental concerns, carboxymethylated cellulose (e.g., carboxymethylhydroxyethylcellulose), which is a biodegradable material, has been used in the past as a retardant in cement compositions. Drawbacks encountered with carboxymethylated cellulose include very high surface slurry viscosities, particularly when higher quantities of the retarder are used to provide retardation for cementing high temperature zones. Other drawbacks to using carboxymethylated cellulose include a decrease in slurry viscosity due to thermal thinning as the slurry temperature increases to wellbore temperature during pumping and placement behind the casing, which may result in potential particle settling. Dispersants and suspension aids are thereby typically used with carboxymethylated cellulose in the cement composition. Additional drawbacks to using carboxymethylated cellulose include treating the cellulose, i.e. hydroxyethylation, to provide water solubility, for example as in the preparation of carboxymethylhydroxyethylcellulose.

Consequently, there is a need for a more effective biodegradable retardant for cement compositions. Further needs include a biodegradable retardant that maintains suspension in cement compositions at high temperatures. Additional needs include a biodegradable retardant that is soluble in water.

BRIEF SUMMARY OF SOME OF THE PREFERRED EMBODIMENTS

These and other needs in the art are addressed in one embodiment by a method of cementing a workspace comprising displacing a cement composition comprising a carboxylated inulin into the workspace. The method further includes allowing the cement composition to set.

In another embodiment, needs in the art are addressed by a cement composition comprising cement and a carboxylated inulin. In some embodiments, the cement composition has a thickening time of from about 2 hours to about 11 hours at temperatures up to about 280° F.

In other embodiments, needs in the art are addressed by a cement composition comprising a cement and a carboxylated inulin. The cement composition has a free water separation of from about 0.0 to about 2 wt. % of the cement composition at temperatures up to about 280° F.

The cement composition comprising carboxylated inulin, for example carboxymethylated inulin, overcomes problems in the art such as high temperatures resulting in particle settling. For instance, the carboxymethylated inulin provides the cement composition with a very low free water separation. In addition, the carboxymethylated inulin allows the cement composition to maintain its viscosity under increasing wellbore temperatures.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

In an embodiment, a cement composition comprises a cement and a carboxylated inulin. The carboxylated inulin acts as a retarder and increases the thickening time of the cement composition. As used herein, "thickening time" refers to the duration that a cement composition remains in a fluid state such that it is capable of being pumped downhole. Due to the presence of the carboxylated inulin, the thickening time of the cement composition is sufficient to allow the cement composition to be pumped to its desired location under high wellbore temperatures. In some embodiments, the carboxylated inulin comprises carboxymethylated inulin.

In an embodiment, the cement composition has a thickening time of from about 2 hours to about 11 hours, and alternatively from about 3 hours to about 8 hours, at temperatures up to about 280° F. In some embodiments, other retardants that are effective for lengthening the thickening time of the cement composition at temperatures above 280° F. may also be added to the cement composition.

The cement compositions exhibit an about constant viscosity under wellbore conditions, including at increasing temperatures. In some embodiments, the cement compositions have an about constant viscosity as temperatures increase up to about 280° F., alternatively up to about 400° F. In contrast, the viscosity of conventional cement compositions typically decreases at increasing temperatures. Because the carboxylated inulin, e.g., carboxymethylated inulin, allows the cement composition to have an about constant viscosity, conventional suspension aids and/or free water reducing agents are not required i.e., the cement composition is substantially free of such. In alternative embodiments, conventional suspension aids and/or free water reducing agents can be added in significantly reduced amounts to the cement composition. Conventional suspension aids include guar polymer derivatives, for example, SUSPEND HT and SA-541 available from Halliburton Energy Services. Conventional free water reducing agents include hydroxyethylatedcellulose, for example FWCA available from Halliburton Energy Services. In alternative embodiments, conventional dispersants, although not required, can be added to the cement composition.

The carboxylated inulin is present in the cement composition in amounts effective to maintain particles therein in suspension and/or control free water separation. In some embodiments, the cement composition comprises a free water separation of from about 0.0 to about 2 wt. % of the cement composition at temperatures from about room temperature to about 280° F. Alternatively, the cement composition comprises a free water separation of from about 0.0 to about 0.1 wt. % of the cement composition at temperatures from about room temperature to about 280° F. As used herein, free water separation refers to the water that is not contained in suspension in the cement composition. Free water separation is determined according to the API Recommended Practice For Testing Well Cements 10B, $23^{rd}$ edition, April 2002.

In the preparation of carboxylated inulin, inulin is extracted from plants and is composed of a mixture of polysaccharides that have different molecular weights and degrees of polymerization, with the average molecular weight and degree of polymerization of the inulin depending on the plant source. The average molecular weight of the inulin is about 500 or higher, alternatively from about 500 to about 13,000. The average degree of polymerization is from about 3 to about 1,000, alternatively from about 5 to about 70. Inulin is available from a wide variety of plant sources such as agave, asparagus root, chicory, dahlia, dandelion, artichoke, leak, and the like. A common source of inulin is chicory. A wide variety of processes exist for processing the inulin from its plant source. A typical process includes slicing and washing the plant source and then extracting the inulin by a hot water diffusion process. The processed inulin product has fructose units that are mainly linked with β (2-1) bonds with each fructose chain ending in a glucose unit. Each glucose unit has 3-OH groups that are capable of reaction.

In one embodiment, the method of carboxylating inulin includes reacting the inulin with chloroacetate to obtain carboxymethylated inulin (CMI). In carboxymethylation, at least a portion of the —OH groups of the inulin are substituted by carboxyl groups in the form of carboxymethylated groups. CMI has a degree of substitution by carboxymethylated of from about 0.1 to about 0.3, alternatively from about 0.15 to about 0.25. Carboxymethylated inulin with a degree of substitution in the range of 0.15-0.25 is disclosed in WO 95/15984, which is incorporated by reference herein in its entirety. In some embodiments, other carboxyl groups are present in place of or in addition to carboxymethyl groups. In such embodiments, the number of carboxymethyl groups is more than the number of the other carboxyl groups. Examples of the other carboxyl groups include without limitation carboxyethyl groups, dicarboxymethylated groups, carboxyethoxycarbonyl groups and the like. Alternately, the carboxyl groups may be introduced into inulin by oxidation with suitable oxidants to form carboxylated inulin. Such oxidized inulins are described in WO 91/17189, WO 95/12619 and WO 95/07303, all of which are incorporated herein by reference in their entirety.

CMI is available commercially as a pure solid and also as an aqueous solution having 15-25 wt. % CMI. Examples of suitable commercial carboxymethylated inulins include without limitation DEQUEST PB11615, DEQUEST PB11620, and DEQUEST PB11625 available from Solutia Inc. In such commercial forms, the CMI is in an aqueous sodium salt solution. It is to be understood that CMI is water soluble. For instance, hydroxyethylation is not required to provide the CMI with water solubility. Therefore, CMI can be mixed with the cement and water without hydroxyethylation to provide solubility.

The cement composition comprises from about 0.01 to about 5 wt. % of carboxylated inulin, alternatively from about 0.1 to about 3 wt. % of carboxylated inulin. In an embodiment, the cement composition comprises a retarder consisting essentially of carboxylated inulin, preferably carboxymethylated inulin. Cement compositions comprising carboxylated inulin, e.g., DEQUEST PB11615, DEQUEST PB11620, and DEQUEST PB11625, indicated a greater than 50% degradability in 14 days when tested using OEDC 301D protocol.

The cement composition comprises a cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof. Suitable median cement particle sizes are from about 0.1 to about 200 microns, alternatively from about 1 to about 150 microns, and alternatively from about 5 to about 120 microns.

A sufficient amount of water is added to the cement to form a pumpable cementitious slurry. The water may be fresh water or salt water, e.g., an unsaturated aqueous salt solution or a saturated aqueous salt solution such as brine or seawater, or a non-aqueous fluid. The water may be present in the amount of from about 30 to about 150 percent by weight of cement, alternatively from about 40 to about 110 percent by weight of cement.

In an embodiment, the cement may also include high temperature strength retainment additives. Examples of such high temperature strength retainment additives include without limitation silica flour and silica materials. SSA-1, which is available from Halliburton Energy Services, is an example of a commercially available silica flour. Without limitation, examples of commercially available silica materials include SILICALITE, SSA-2, and MICROSAND available from Halliburton Energy Services. Such materials may be used in amounts ranging from about 5 to about 45 percent by weight of cement. In other embodiments, density reducing additives can be added to the cement. Without limitation, examples of density reducing additives include hollow glass beads, hollow cenospheres and the like.

In conditions wherein the cement composition may be exposed to wellbore conditions above about 280° F., some embodiments can include adding other retardants in addition to carboxylated inulin to the cement composition. Such other retardants are added in amounts effective to provide the cement composition with a thickening time at temperatures above 280° F. from about 2 hours to about 11 hours, and alternatively from about 3 hours to about 8 hours. In an embodiment, the cement composition comprises from about 0.01 to about 5 wt. % of the other retardants, alternatively from about 0.1 to about 2 wt. % of the other retardants.

Such other retardants include borate salts, organic acids including alpha-hydroxycarboxylic acids, synthetic polymers comprising carboxylate groups, and any combination thereof. Examples of organic acids include without limitation citric acid, tartaric acid, gluconic acid and any combination thereof.

In some embodiments, additional additives may be added to the cement composition for improving or changing the properties thereof. Examples of such additives include but are not limited to fluid loss control agents, defoamers, weighting agents, foaming surfactants, and formation conditioning agents. Foaming surfactants comprising foam formers and foam stabilizers can be added to cement slurries and foamed with an inert gas to incorporate gas in the range of from about 10% to about 30% by volume to reduce slurry densities.

The foregoing cement compositions may be used in various cementing operations wherein the cement is displaced into a workplace and allowed to set. In an embodiment, the cement compositions are used in various surface applications to cement a workspace at or above the ground, for example a workspace encountered in the construction industry. In another embodiment, the cement is used in a subterranean workspace, for example in cementing underground pipe such as sewer pipe or wellbore casing. In one embodiment, the cement compositions may be employed in primary cementing a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be displaced down through the conduit and up through the annulus one or more times, for example, twice, to clean out the hole. The cement composition may then be conveyed downhole and up through the annulus, thereby displacing the drilling fluid from the wellbore. The thickening time of the cement composition is sufficient to allow it to be pumped to and placed within the annulus. The cement composition sets into a hard mass, which forms a cement column that isolates an adjacent portion of the subterranean formation and provides support to the adjacent conduit.

In another embodiment, the cement composition may be employed in a secondary cementing operation such as squeeze cementing, which is performed after the primary cementing operation. In squeeze cementing, the cement composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The thickening time of the cement composition is relatively long such that the composition may be properly placed in the permeable zones. The cement composition sets within the permeable zones, thereby forming a hard mass to plug those zones and prevent fluid from leaking therethrough.

It is to be understood that the cement compositions can be made by combining all of the components in any order and mixing the components in any sufficient manner known to one of ordinary skill in the art.

To further illustrate various illustrative embodiments of the present invention, the following examples are provided.

EXAMPLES 1-4

The cement slurries were prepared and tested for thickening times according to API Recommended Practice For Testing Well Cements 10B, 23$^{rd}$ edition, April 2002.

The Examples show the capabilities of CMI as a retardant by providing measured thickening times of cement compositions at various temperatures and weight percents of CMI. For each Example, the following components were blended: 100% class H cement, 35% SSA-1, and 51% water to obtain slurries of 16.2 ppg density, with all percentages being by weight of the cement. CMI was also a component in the cement compositions, with each Example having a different amount of CMI as noted in the Table below. The CMI wt. % for each Example noted in the Table are also percentages by weight of the cement.

The thickening time for 16.2 pounds per gallon (ppg) of the cement composition for each Example was determined at 3000 psi and the temperatures indicated. Thickening time tests were performed according to the procedures in the API Recommended Practice for Testing Well Cements 10B, 23$^{rd}$ edition, April 2002. Data from the standard API schedule was used to prepare a test schedule to simulate the anticipated well conditions. The thickening times were obtained using an HPHT consistometer and were terminated at 100 Bearden units.

The Table below lists the obtained thickening time results of each Example at different temperatures. The thickening times in the Table are noted as Hours:Minutes. The results listed in the Table noted as "---" are for thickening times that were expected to be unnecessarily long.

TABLE

| Example No. | Wt. % CMI | 80° F. | 150° F. | 180° F. | 200° F. | 280° F. |
|---|---|---|---|---|---|---|
| Ex. 1 | 0.15 | — | 4:30 | 3:12 | 1:40 | — |
| Ex. 2 | 0.3 | 28:36 | 19:09 | 4:57 | 3:40 | 1:40 |
| Ex. 3 | 0.45 | — | — | 30:38 | 7:20 | 3:30 |
| Ex. 4 | 0.6 | — | — | — | — | 4:40 |

The obtained results indicate that CMI is effective for lengthening the thickening time of cements in oilwell applications. It is shown that the CMI is an effective retarder at temperatures up to about 280° F. without using other retarders.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of cementing comprising:
providing a cement comprising a carboxylated inulin, water, cement and a dispersant, wherein the carboxylated inulin is derived from an inulin having an average molecular weight of about 500 or higher; and
allowing the cement composition to set.

2. The method of claim 1 wherein the cement composition has a thickening time of from about 2 hours to about 11 hours at temperatures res up to about 280° F.

3. The method of claim 1 wherein a viscosity of the cement composition is about constant for a period of time after the cement composition is placed.

4. The method of claim 1 wherein the cement composition has a free water separation of from about 0.0 to about 2 wt. % of the cement composition.

5. The method of claim 1 wherein the carboxylated inulin comprises carboxymethylated inulin.

6. The method of claim 5 wherein the carboxymethylated inulin has a degree of substitution by carboxymethylation of from about 0.1 to about 0.3.

7. The method of claim 1 wherein the cement composition comprises from about 0.1 to about 5 wt. % of carboxylated inulin.

8. The method of claim 1 wherein the cement composition is placed in a subterranean formation.

9. The method of claim 1 wherein the cement composition is placed in a wellbore.

10. The method of claim 9 wherein the temperature of a portion of the wellbore exceeds 150° F.

11. The method of claim 1 further comprising placing the cement composition into a workspace, wherein the workspace is above ground.

12. The method of claim 1 wherein the carboxylated inulin has an average degree of polymerization of from about 3 to about 1000.

13. The method of claim 1 wherein the temperature of a portion of the workspace is between 300-400° F.

14. A method of cementing in a subterranean formation comprising:
circulating a drilling fluid in a wellbore;
providing a cement composition comprising a carboxylated inulin, wherein the carboxylated inulin is derived from an inulin having an average molecular weight of about 500 or higher;
placing the cement composition in the subterranean formation, wherein the cement composition displaces at least a portion of the drilling fluid from the wellbore; and
allowing the cement composition to set therein.

15. The method of claim 14 wherein the cement composition has a thickening time of from about 2 hours to about 11 hours at temperatures up to about 280° F.

16. The method of claim 14 wherein a viscosity of the cement composition is about constant for a period of time after the cement composition is placed.

17. The method of claim 14 wherein the cement composition has a free water separation of from about 0.0 to about 2 wt. % of the cement composition.

18. The method of claim 14 wherein the cement composition comprises from about 0.1 to about 5 wt. % of carboxylated inulin.

19. The method of claim 14 wherein the cement composition further comprises borate salts, an organic acid comprising an alpha-hydroxycarboxylic acid, a synthetic polymer comprising a carboxylate group, or any combination thereof.

20. The method of claim 19 wherein the organic acid comprises citric acid, tartaric acid, gluconic acid, or combinations thereof.

21. The method of claim 14 wherein the carboxylated inulin has an average degree of polymerization of from about 3 to about 1000.

22. The method of claim 14 wherein the carboxylated inulin is prepared by reacting inulin with chloroacetate.

23. The method of claim 14 wherein the carboxylated inulin is prepared by oxidation.

24. The method of claim 14 wherein the carboxylated inulin comprises carboxyethyl groups, dicarboxymethyl groups, carboxyethyoxycarbonyl groups, or combinations thereof.

25. The method of claim 14 wherein the cement composition comprises a hydraulic cement.

26. The method of claim 25 wherein the median cement particle size is from about 0.1 microns to about 200 microns.

27. The method of claim 14 wherein the cement composition further comprises a high temperature strength retainment additive.

28. The method of claim 27 wherein the high temperature strength retainment additive comprises silica or silica materials.

29. The method of claim 14 wherein the cement composition further comprises density reducing additives.

30. The method of claim 29 wherein the density reducing additive comprises hollow glass beads or cenospheres.

31. The method of claim 14 wherein the cement composition further comprises from about 0.01 wt. % to about 5 wt. % of another retardant.

32. The method of claim 14 wherein the cement composition further comprises an inert gas.

33. The method of claim 32 wherein the inert gas is incorporated into composition in an amount of from about 10% to about 30% by volume.

34. The method of claim 14 wherein the carboxylated inulin comprises carboxymethylated inulin.

35. The method of claim 34 wherein the carboxymethylated inulin has a degree of substitution by carboxymethylation of from about 0.1 to about 0.3.

36. The method of claim 14 wherein the temperature of a portion of the workspace is between 300-400° F.

37. A method of cementing comprising:
introducing a cement composition comprising a carboxylated inulin to a set cement formation having permeable zones, wherein the carboxylated inulin is derived from an inulin having an average molecular weight of about 500 or higher, and wherein the cement composition is forced under pressure into the permeable zones; and
allowing the cement composition to set therein.

38. The method of claim 37 wherein the permeable zones are fissures, cracks, streaks, flow channels, voids, high permeability streaks, annular voids, or combinations thereof.

39. The method of claim 37 wherein the composition exhibits a constant rheology up to 400° F.

40. A method comprising:
providing a cement composition consisting of a carboxymethylated inulin, a hydraulic cement, a silica material, and water, wherein the carboxylated inulin is derived from an inulin having an average molecular weight of about 500 or higher;
placing the cement composition into a workspace, wherein the temperature of a portion of the workspace is between 300-400° F.; and
allowing the composition to set, wherein the cement composition is substantially free of suspension aids.

41. A method of cementing comprising:
providing a cement composition comprising at least two retardants;
placing the cement composition into a workspace, wherein the temperature of a portion of the workspace is between 300-400° F.,
allowing the cement composition to set, wherein the cement composition is substantially free of water-reducing agents, wherein one of the at least two retardants comprises carboxylated inulin and another one of the at least two retardants is selected from the group consisting of borate salts, polymers comprising carboxylate groups, tartaric acid, gluconic acid and combinations thereof; and wherein the carboxylated inulin is derived from an inulin having an average molecular weight of about 500 or higher.

* * * * *

UNITED STATES PATENT AND TRADEMARK OFFICE
CERTIFICATE OF CORRECTION

PATENT NO. : 8,858,860 B2  
APPLICATION NO. : 10/979681  
DATED : October 14, 2014  
INVENTOR(S) : Ashok K. Santra et al.

Page 1 of 1

It is certified that error appears in the above-identified patent and that said Letters Patent is hereby corrected as shown below:

In the Claims:

In Column 7, Claim 2, line 38, replace "temperatures res up" with --temperatures up--.

Signed and Sealed this  
Third Day of February, 2015

Michelle K. Lee  
*Deputy Director of the United States Patent and Trademark Office*